(12) United States Patent
Johnston

(10) Patent No.: US 6,742,380 B2
(45) Date of Patent: Jun. 1, 2004

(54) TECHNIQUE FOR MEASURING SMALL DISTANCES BETWEEN, AND FOR MEASURING THE FLATNESS OF, ELECTRICALLY CONDUCTIVE SURFACES

(75) Inventor: Matthew M. Johnston, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 149 days.

(21) Appl. No.: 09/917,363

(22) Filed: Jul. 27, 2001

(65) Prior Publication Data

US 2002/0029609 A1 Mar. 14, 2002

Related U.S. Application Data

(60) Provisional application No. 60/221,532, filed on Jul. 28, 2000.

(51) Int. Cl.[7] ................................................ G01B 21/30
(52) U.S. Cl. ............................. 73/1.89; 73/1.81; 73/105
(58) Field of Search ............................... 73/1.79, 1.81, 73/1.89, 105, 866.5, 104; 250/306, 307

(56) References Cited

U.S. PATENT DOCUMENTS

| 4,724,318 A | * | 2/1988 | Bennig ........................ 250/306 |
| 5,283,442 A | * | 2/1994 | Martin et al. ................. 250/561 |
| 5,308,974 A | * | 5/1994 | Elings et al. ................. 250/234 |
| 5,325,010 A | * | 6/1994 | Besocke et al. ............. 310/317 |
| 5,465,611 A | * | 11/1995 | Ruf et al. ...................... 73/104 |
| 5,578,745 A | * | 11/1996 | Bayer et al. .................. 73/1.73 |
| 5,656,349 A | * | 8/1997 | Gomi et al. ................. 428/65.3 |
| 5,689,057 A | * | 11/1997 | Baumgart et al. ........... 73/1.73 |
| 5,847,383 A | * | 12/1998 | Tong ........................... 250/234 |
| 6,094,971 A | * | 8/2000 | Edwards et al. .............. 73/105 |
| 6,207,247 B1 | * | 3/2001 | Morita ........................ 428/64.1 |
| 6,408,677 B1 | * | 6/2002 | Suzuki ........................ 73/1.89 |
| 6,537,648 B1 | * | 3/2003 | Takahashi et al. .......... 428/141 |
| 2001/0040864 A1 | * | 11/2001 | Hosaka et al. | |

OTHER PUBLICATIONS

"Precision Measurement of the Casimir Force from 0.1 to 0.9 μm" by U. Mohideen et al, for *Physical Review Letters*, vol. 81, No. 21, Nov. 23, 1998.

\* cited by examiner

*Primary Examiner*—Hezron Williams
*Assistant Examiner*—Charles D. Garber
(74) *Attorney, Agent, or Firm*—Westman, Champlin & Kelly

(57) ABSTRACT

A method and apparatus for measuring the distance between first and second proximately disposed electrically conductive surfaces is provided in which the force exerted between the first and second surfaces is measured to obtain an exerted force value. A separation distance between the first and second surfaces is determined as a function of the exerted force value.

19 Claims, 9 Drawing Sheets

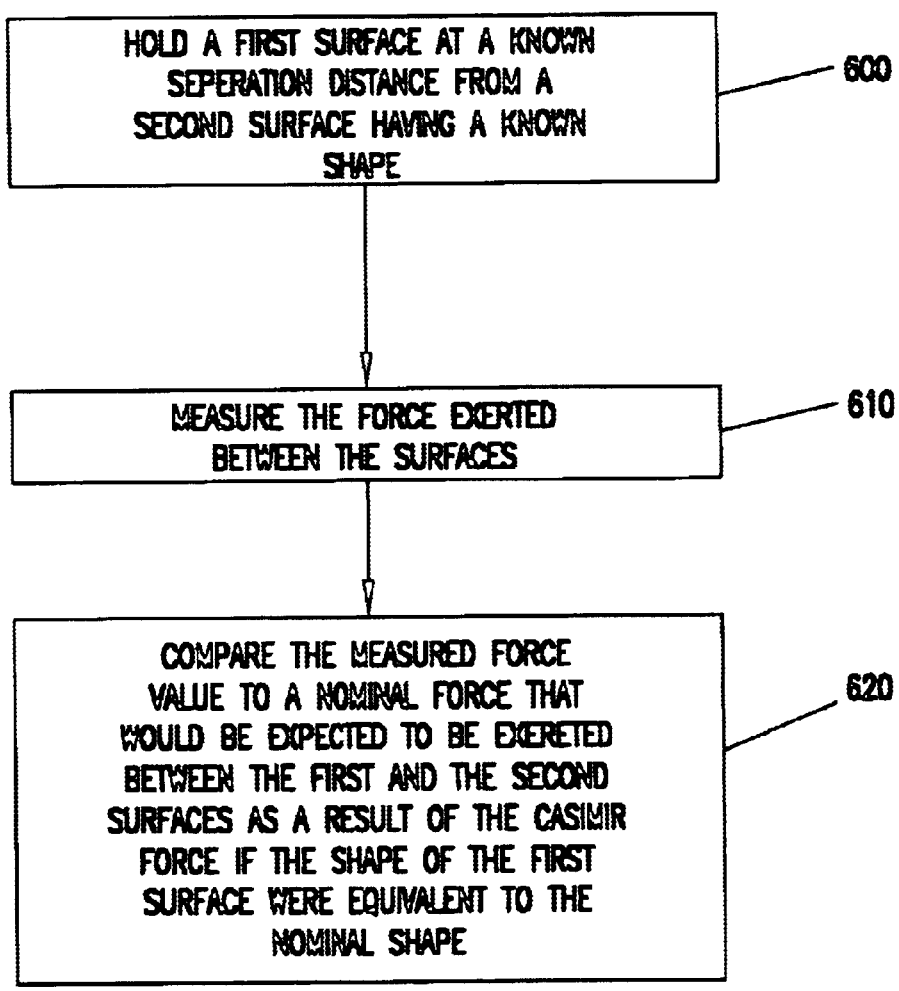

US 6,742,380 B2

TECHNIQUE FOR MEASURING SMALL DISTANCES BETWEEN, AND FOR MEASURING THE FLATNESS OF, ELECTRICALLY CONDUCTIVE SURFACES

CROSS-REFERENCE TO RELATED APPLICATION

This application claims the benefit of U.S. Provisional Patent Application No. 60/221,532, entitled "TECHNIQUE FOR MEASURING SMALL DISTANCES BETWEEN METAL PLATES," filed on Jul. 28, 2000, which is herein incorporated by reference.

FIELD OF THE INVENTION

The present invention relates generally to methods of measuring small distances between, and for measuring the flatness of, electrically conductive surfaces. More particularly, the present invention relates to using the Casimir force to measure small distances between, and to measure the flatness of, electrically conductive surfaces.

BACKGROUND OF THE INVENTION

Electronic and mechanical devices of all kinds are becoming smaller, thus requiring continually increasing precision in their manufacture. The resolution required for the manufacturer of certain devices at times approaches the nanometer level. Moreover, this resolution is being required over larger and larger distances, so that many devices can be made in a single manufacturing operation. Measurement of very small distances are frequently required in applications involving nanotechnology, which is the synthesis and integration of material, processes and devices in sub-micrometer size range. In the past few years, computer technology has experienced miniaturization and power previously believed impossible. Mass storage devices are one of many components of modern computers. One type of mass storage device is the fixed disc drive. Such drives are used to store vast amounts of information relating to operating systems, applications, and user data. Precision measurement needs for disc drives are increasing with the miniaturization of disc drive components.

In the field of very small (less than approximately 500 Angstroms) distance measurement, some prior systems employ light interferometry to measure the distance between two very closely spaced surfaces. Other systems use electrostatic or capacitive techniques. These systems begin to lose capability as the distance being measured approaches the point of contact. Interferometry techniques lose capability at very small distances because the shortest wavelength of visible light is too wide to be efficiently used to make measurements of very small distances. Electrostatic and capacitive techniques are hindered by the fact that charge transfer (arcing) occurs from one surface to the other at very close distances and metallic contact point conduction occurs upon the contact of metallic surfaces.

The present invention addresses these problems and offers other advantages over the prior art.

SUMMARY OF THE INVENTION

The present invention relates to the measurement of very small distances between, and the flatness of, electrically conductive surfaces.

One embodiment of the present invention relates to a method of measuring the distance between first and second proximately disposed electrically conductive surfaces. The method includes measuring the force exerted between the first and second surfaces to obtain an exerted force value, and determining a separation distance between the first and second surfaces as a function of the exerted force value.

Another embodiment of the present invention relates to a method of determining the degree to which the shape of a first electrically conductive surface varies from a nominal shape. The method includes holding the first surface a known separation distance from a second electrically conductive surface having a known shape. The force exerted between the first and second surfaces is measured to obtain an exerted force value. The measured exerted force value is compared to a nominal force value that would be expected to be exerted between the first and second surfaces as a result of the Casimir force if the shape of the first surface were equivalent to the nominal shape. A difference between the measured exerted force value and the nominal force value is obtained.

These and various other features as well as advantages which characterize the present invention will be apparent upon reading of the following detailed description and review of the associated drawings.

BRIEF DESCRIPTION OF THE DRAWINGS

FIG. 6-1 is a flow chart representing a method determining the degree to which the shape of an electrically conductive surface varies from the nominal shape according to an embodiment of the present invention.

FIG. 6-2 is an apparatus to measure the distance between a spherical surface and a flat surface using the Casimir force in accordance with an embodiment of the present invention.

DETAILED DESCRIPTION

According to quantum mechanics, a vacuum is not empty, but teeming with virtual particles that constantly wink in and out of existence. One strange consequence of this sea of activity is the Casimir effect. The Casimir effect is a measurable phenomenon wherein two flat metal surfaces automatically attract one another if they get close enough to each other. The Casimir force is so weak that it has rarely been detected at all, but recent experiments have made the most precise measurements ever of the phenomenon.

The simplest explanation of the Casimir effect is that two flat closely positioned metal plates attract because their reflective surfaces exclude virtual photons of wavelengths longer than the separation distance. This reduces the energy density between the plates compared with the energy density adjacent the plates, and, like external air pressure tending to collapse a slightly evacuated vessel, the Casimir force pulls the plates toward one another. The Casimir effect depends on geometry. If the plates are replaced by hemispherical shells, the force is repulsive. Spherical surfaces somehow "enhance" the number of virtual photons. There is no simple way to tell which way the force will go before carrying out the calculations.

In embodiments described below, the calculation of the Casimir force is used to measure small distances between, and to measure the flatness of, electrically conductive surfaces. For example, the present invention is useful to conduct precision measurements of microstructure devices such as disc drive sliders, and to measure the flatness of disc surfaces in disc drives.

Figure 1:
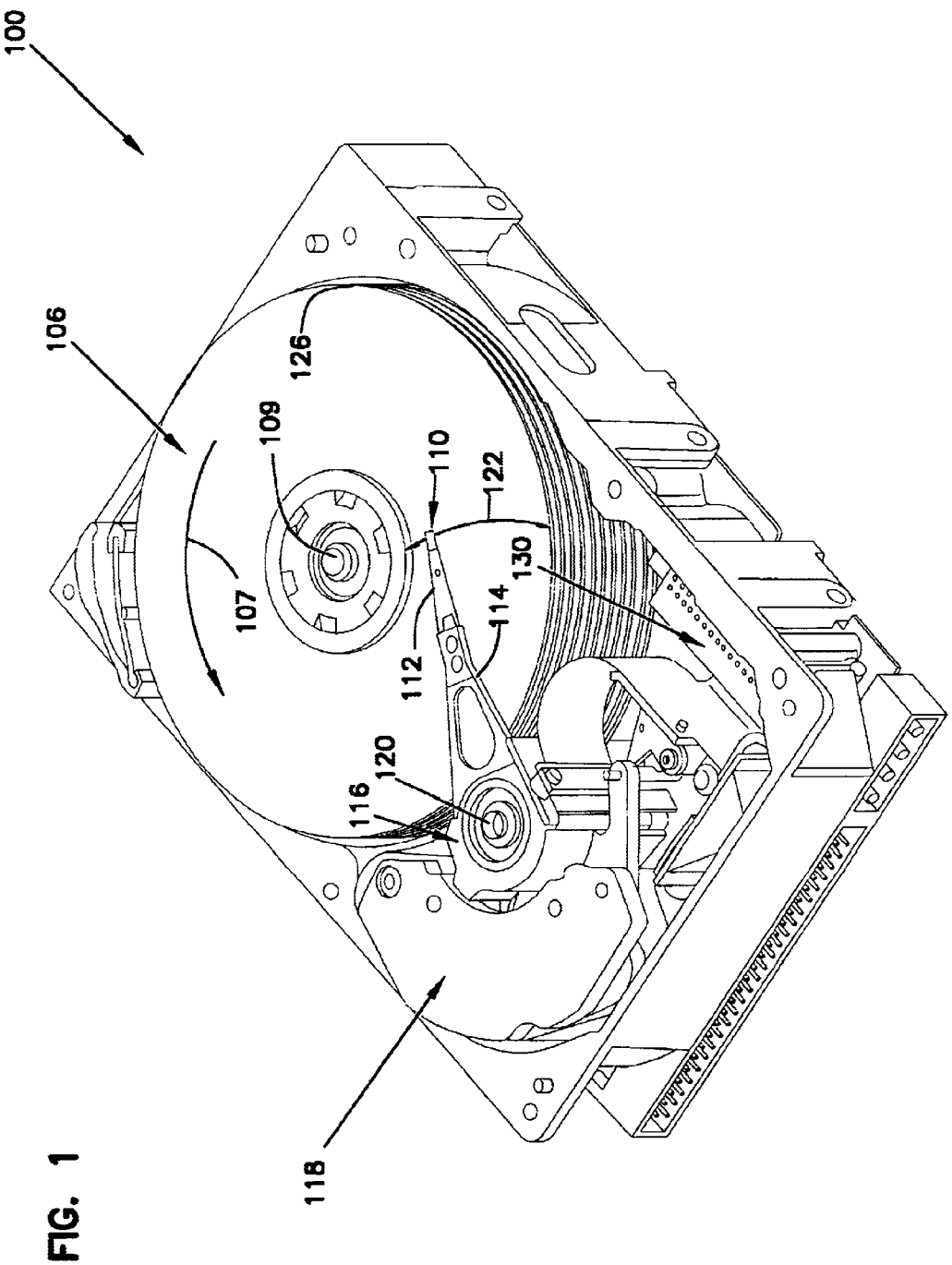
FIG. 1 is a perspective view of a disc drive storage device with which the present invention is useful.

In FIG. 1, an embodiment of a disc drive storage device 100 is illustrated. Disc drive 100 includes a disc pack 126 having storage surfaces 106 that are typically layers of magnetic material that are deposited using microstructure fabrication techniques. The disc pack 126 includes a stack of multiple discs and the read/write head assembly 112 includes a read/write transducer or head 110 for each stacked disc. The head 110 is typically formed using microstructure fabrication techniques. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive 100 and transferring data in and out of the disc drive.

Typically, the disc drive head 110 slides over the storage surface 106 in the disc drive 100 as illustrated. If there are defects (microscopic bumps or asperities) of a large enough dimension between the sliding surfaces, then there is an increased risk that one of the sliding surfaces may be damaged during operation. In modern disc drives a critical dimension can approach 5 nanometers between the head 110 and the storage surface 106. The sliding surfaces need to be tested for defects before assembly of the disc drive 100. Methods and apparatus for measurement of very small distances between, and the flatness of, electrically conductive surfaces are described below in connection with FIGS. 2–8.

Figure 2:
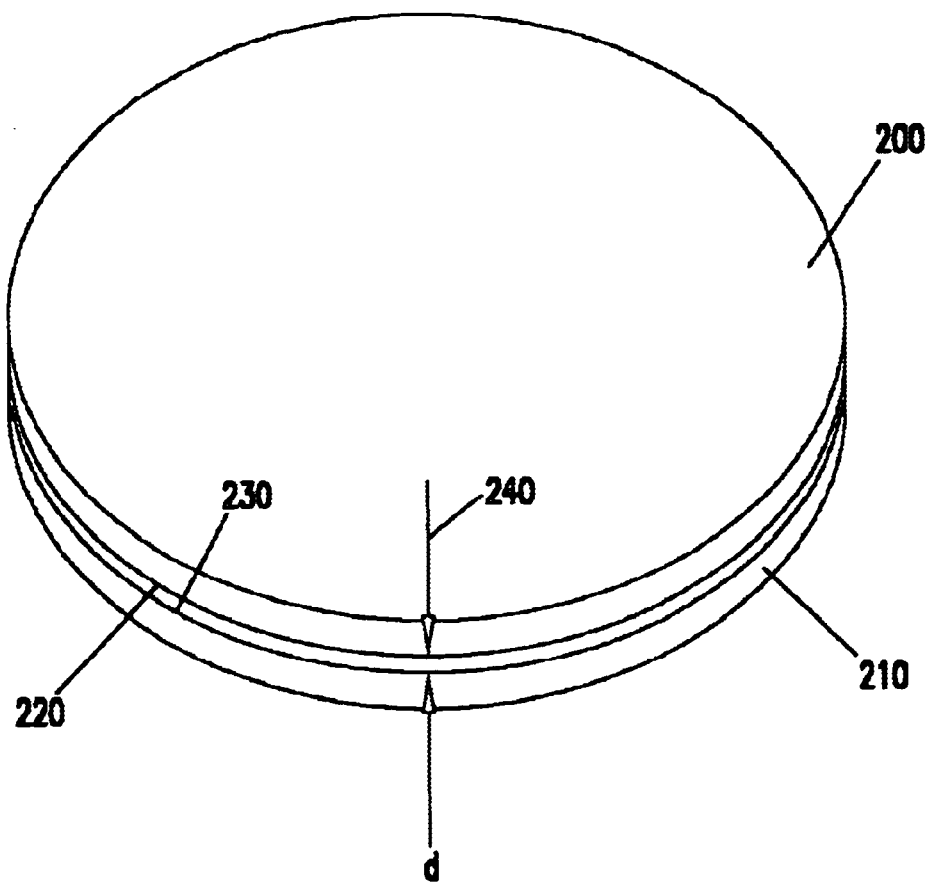
FIG. 2 shows two electrically conductive plates with which the present invention can be used.

An illustrative embodiment of the present invention is directed to a method of measuring the distance between two very closely situated electrically conductive surfaces such as those shown in FIG. 2. FIG. 2 shows two electrically conductive plates 200 and 210. Surface 220 of plate 200 and surface 230 of plate 210 are disposed substantially parallel to each other and are separated by a separation distance, "d" 240.

The Casimir force causes two parallel conductive plates such as plates 200 and 210 to be attracted to each other at very close separation distances. The Casimir force is exerted between two parallel metal plates in close proximity in a vacuum according to the following relation:

$$F = \frac{A\pi^2 \hbar c}{240 d^4}$$

From the above relation it follows that $$d = \sqrt[4]{\frac{A\pi^2 \hbar c}{240 F}} \qquad \text{Equation (1)}$$

where A is the area of the smallest plate, c is the speed of light, $\hbar$ is Planck's constant and d represents the separation distance between the plates. This force is exerted at such close distances as to be negligible up to very near the point of contact. As previously mentioned, although the Casimir force between parallel plates is an attractive force, the Casimir force is actually repulsive with respect to surfaces of other geometries, such as spherical surfaces, for example.

Figure 3:
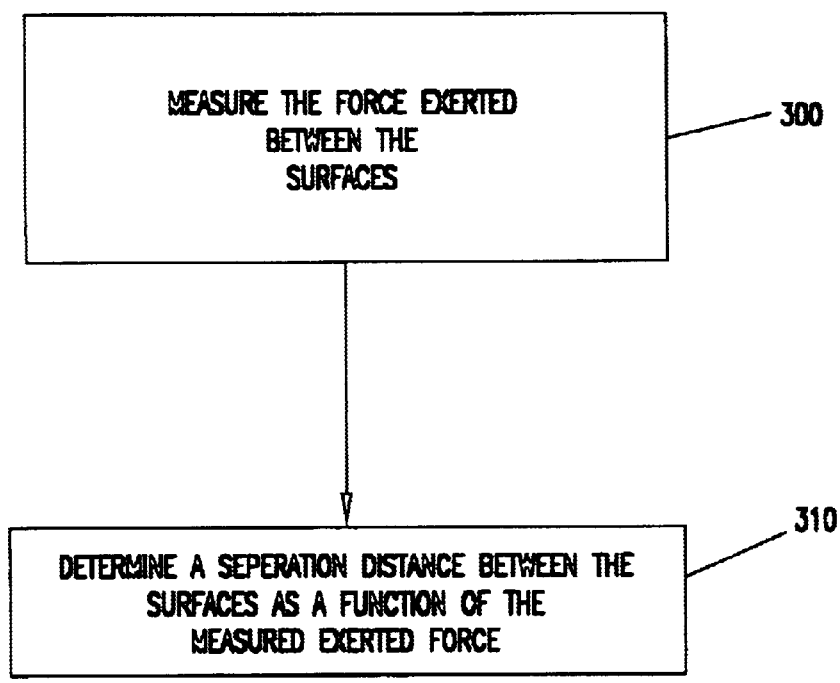
FIG. 3 is a flow chart representing a method of measuring the distance between two electrically conductive surfaces in accordance with an embodiment of the present invention.

According to an illustrative embodiment of the present invention, the Casimir effect is used to measure the distance between two electrically conductive surfaces such as surfaces 220 and 230 in FIG. 2. FIG. 3 is a flow chart representing a method of measuring the distance between two electrically conductive surfaces 200, 210 according to an illustrative embodiment of the present invention. At step 300, the force exerted between the surfaces 200, 210 is measured. At step 310, the measured force is correlated with a separation distance using the above-identified relation that relates Casimir force to separation distance. In this way, the separation distance, such as the distance, d 240, in FIG. 2, is determined. This method is particularly advantageous for measuring separation distances of less than or equal to approximately 500 Angstroms.

The method represented by FIG. 3 can be employed with adjacent surfaces of substantially any geometry. In a particularly useful embodiment, the method of FIG. 3 is used to determine the separation distance between two substantially flat conductive surfaces that are disposed parallel to each other such as surfaces 220 and 230. In an illustrative embodiment of step 310 of the method represented in FIG. 3, the separation distance between two conductive parallel surfaces such as surfaces 220 and 230 in FIG. 2 is determined using equation (1).

The Casimir force is exerted at such close distances as to be negligible up to very near the point of contact. The Casimir force is negligible compared to the forces generated by air pressure differentials at or near the point of contact. Therefore, in an illustrative embodiment of the present invention, the objects under test, such as plates 200 and 210, are held at a near vacuum. Similarly, electrostatic forces between the surfaces 220, 230 can severely interfere with the measurement of the Casimir force. Thus, in an illustrative embodiment, the plates 200, 210 are electrically connected so that the surfaces 220, 230 have no electrical charge differential, thereby canceling out electrostatic forces between the surfaces 220, 230. The plates 200, 210 can be electrically coupled by welds, bolts, a ground strap, or by other means.

As previously mentioned, the separation distance exerted between two conductive parallel surfaces, such as 200 and 210 is determined using equation (1). However, the area (A) of the smallest plate must be known in order to determine separation distance (d) using equation (1). If A is unknown, d can be determined using equation (2) below:

$$F = \frac{\Delta F(\Delta d)^4}{d^4} \qquad \text{Equation (2)}$$

$$d = \sqrt[4]{\frac{\Delta F(\Delta d)^4}{F}}$$

where d is the value of the separation distance to be determined and F is the attractive force value corresponding to the separation distance to be determined.

Figure 4:
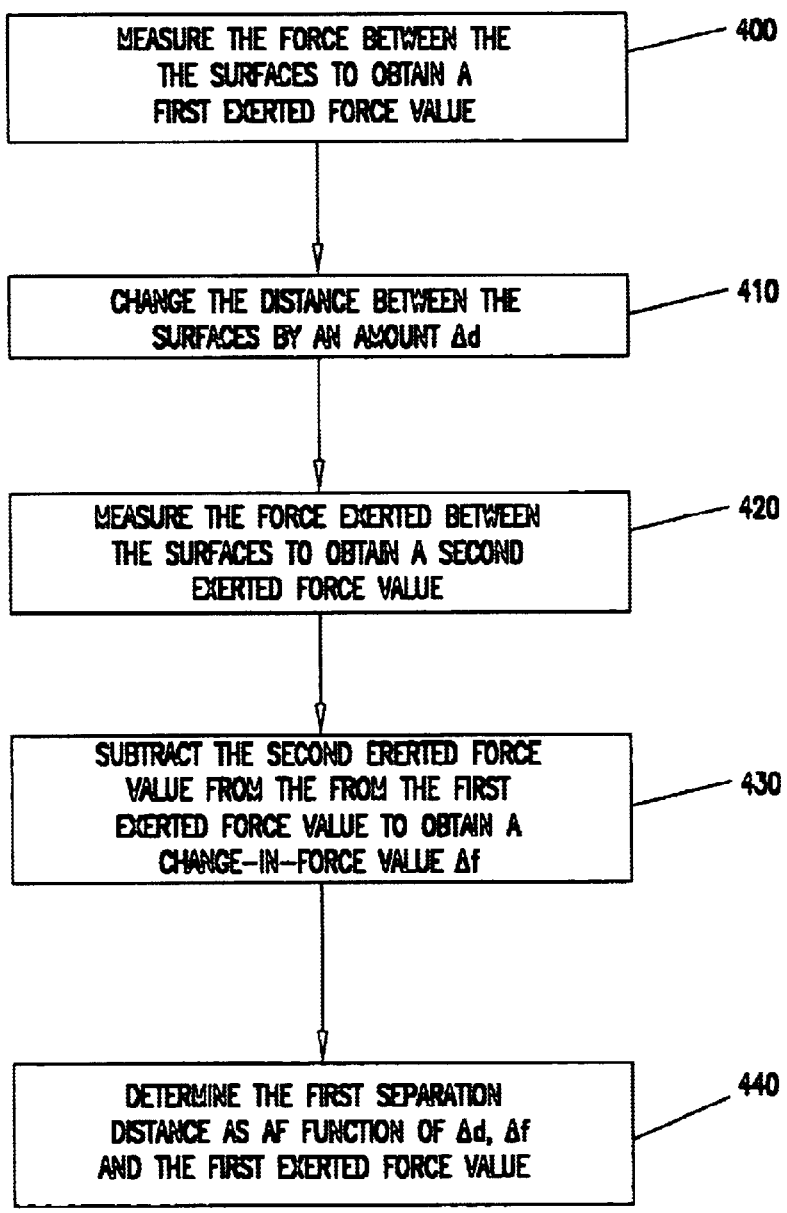
FIG. 4 is a flow chart representing a method of measuring the distance between two electrically conductive surfaces according to another illustrative embodiment of the present invention.

FIG. 4 is a flow chart representing a method of measuring the distance between two electrically conductive surfaces 200, 210 according to another illustrative embodiment of the present invention. The method of FIG. 4 is particularly advantageous for measuring separation distance when the area of the smallest plate is unknown. At step 400, the force exerted between the surfaces 200, 210 is measured to obtain a first exerted force value. At step 410, the separation distance between the surfaces is changed by an amount, Δd. At step 420, the force exerted between the surfaces is measured to obtain a second exerted force value. At step 430, the second exerted force value is subtracted from the first exerted force value to obtain a change-in-force value, ΔF. At step 440, the first separation distance is determined based on Δd, ΔF and the force exerted at that distance using equation (2). Thus, the separation distance, such as the distance, "d" 240, in FIG. 2 is determined, when the area of the smallest plate is unknown.

Figure 5:
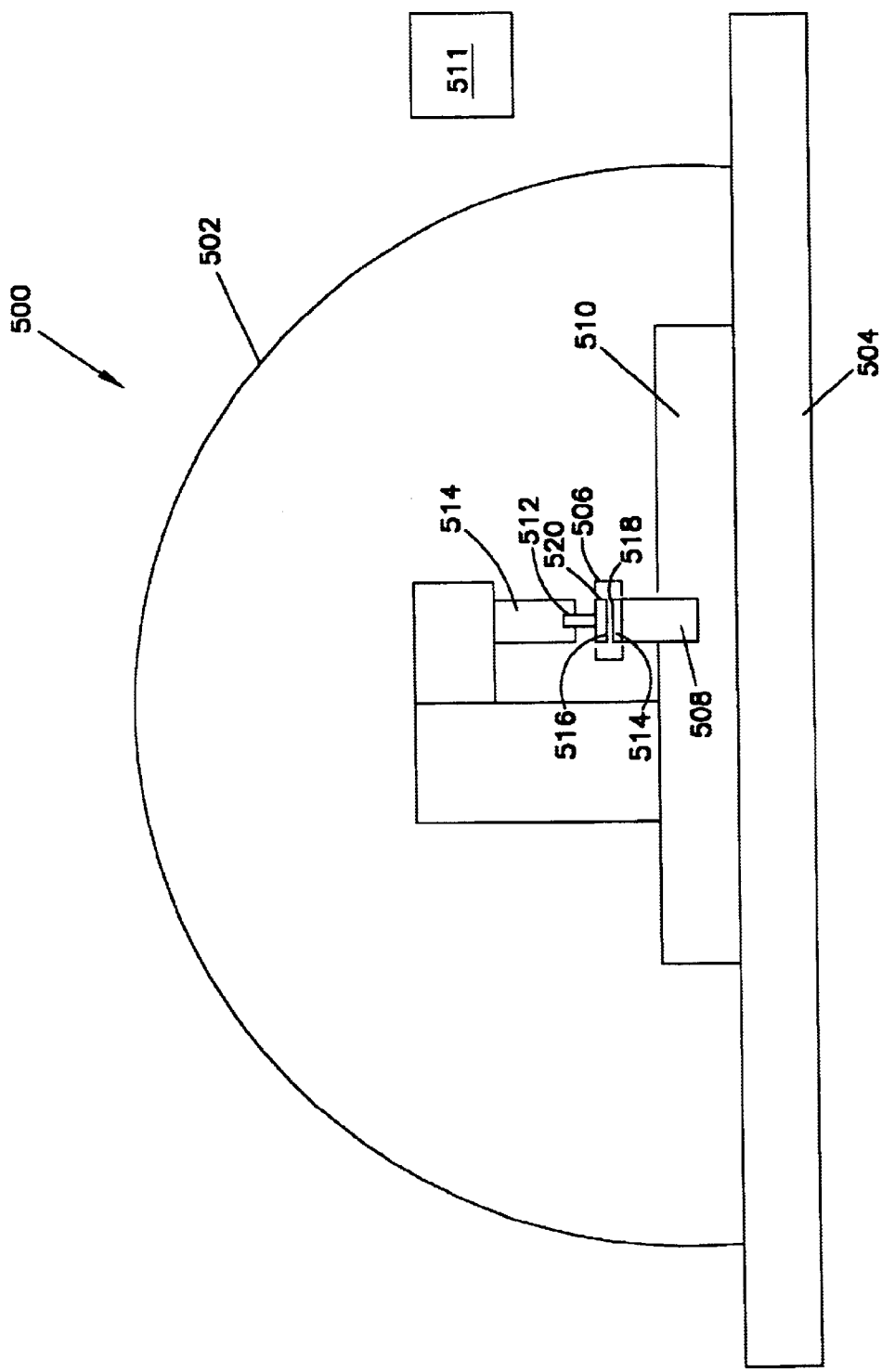
FIG. 5 is an apparatus to measure the distance between two electrically conductive surfaces using the Casimir force in accordance with an embodiment of the present invention.

Referring now to FIG. 5, an apparatus to measure the distance between two electrically conductive surfaces using the Casimir force in accordance with an embodiment of the present invention is shown. Measurement apparatus 500 includes a vacuum bell jar 502 with a base 504, which holds an object 506 including two electrically conductive surfaces at a near vacuum. Plate 514 of object 506 is supported by an anvil 508 that is mounted on a platform 510. An integrated actuator and force transducer 512, supported by fixture 513, moves toward or away from anvil 508. Integrated actuator and transducer 512 is brought in contact with plate 516 of object 506 to measure the exerted force between surfaces 518 and 520 of plates 514 and 516 respectively. A processor 511, which is coupled to transducer 512, determines a separation distance between surfaces 518, 520 of object 506 by correlating the exerted force value, measured by force transducer 512, with the separation distance between surfaces 518, 520 using equations (1) or (2) that relates Casimir force to separation distance. The vacuum level within bell jar 502 is maintained, for example, below 0.5 Torr to reduce air pressure interference since the Casimir force is negligible compared to the forces generated by air pressure differentials near the point of contact between surfaces 518 and 520. Typically, the temperature within vacuum bell jar is controlled to ensure accurate measurements. A separate actuator and transducer, connected in series, may be employed instead of integrated actuator and transducer 512. Devices such as piezoelectric transducers, atomic force microscopes, etc., can be used to measure force between surfaces 518 and 520.

In addition to utilizing the measurable Casimir effect to determine distances between electrically conductive surfaces as described above, it can also be used to determine the degree to which the shape of an electrically conductive surface varies from a nominal shape (for example, the degree to which the shape of a surface with bumps varies from a flat surface).

Figures 2, 6:
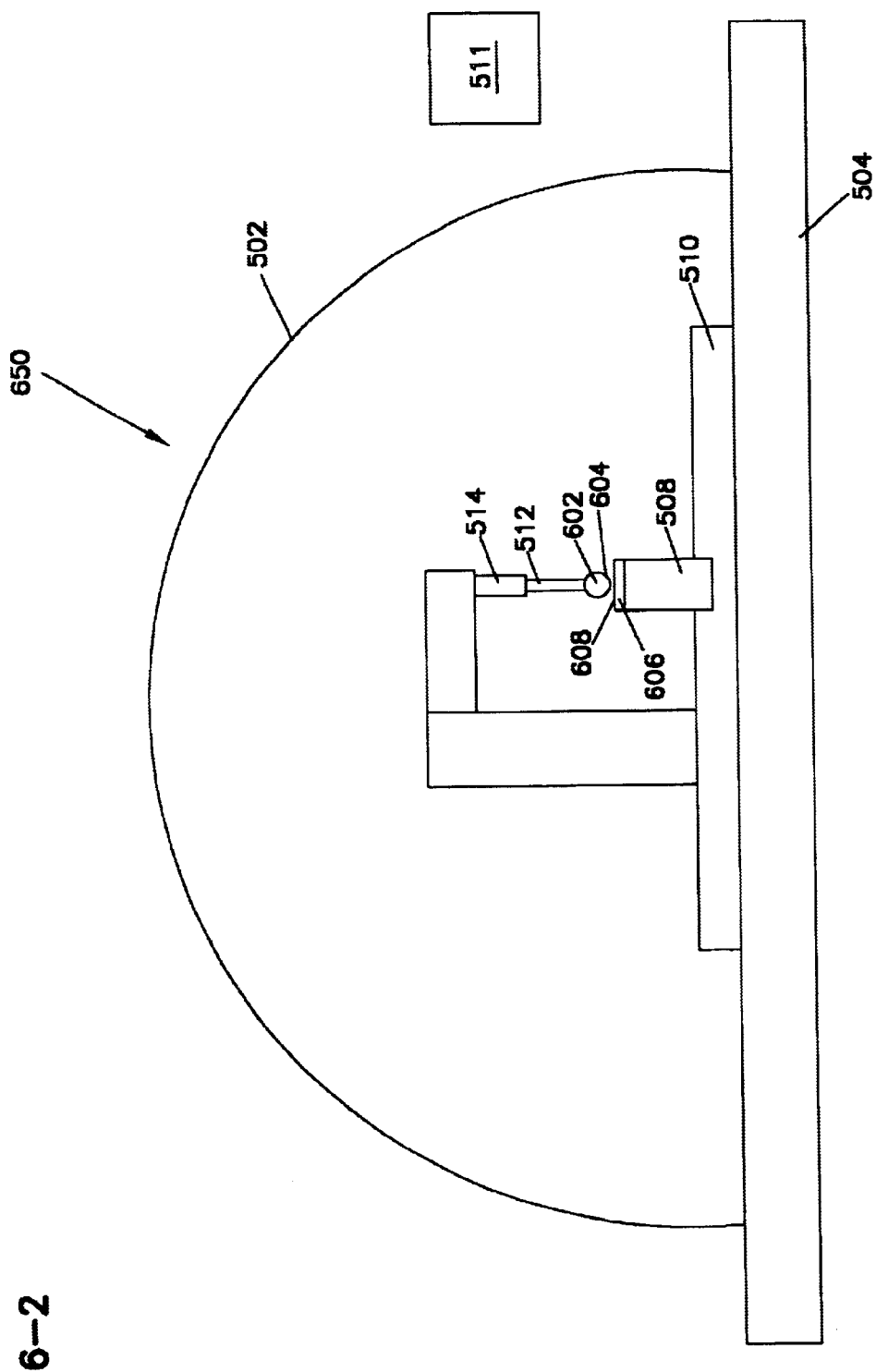

Referring now to FIG. 6-1, a flow chart representing a method determining the degree to which the shape of an electrically conductive surface varies from the nominal shape, is shown. At step 600, a first surface (such as 220 of FIG. 2) is held at a known distance from a second surface (such as 230) having a known shape. At step 610, the force exerted between the first surface (such as 220) and the second surface (such as 230) is measured. At step 620, the measured force value is compared to a nominal force that would be expected to be exerted between the first and the second surfaces as a result of the Casimir force if the shape of the first surface were equivalent to the nominal shape. The method represented by FIG. 6-1 can be employed with surfaces of substantially any geometry.

In a particularly useful embodiment, the method of FIG. 6-1 can be employed to determine defects in flat surfaces. The force between a flat surface and a reference surface with a known shape held at a first separation distance from the flat surface is measured to obtain a nominal force value. The flat surface is then replaced with a test surface whose flatness has to be determined. The test surface is held at the first separation distance from the reference surface. The force between the test surface and the reference surface is measured to obtain an exerted force value. The variation in flatness of the test surface from a flat surface is indicated by the difference between the exerted force value and the nominal force value.

In addition to being used to measure small distances between surfaces, the apparatus of FIG. 5 can also be used to measure the degree to which the shape of an electrically conductive surface varies from a nominal shape. The integrated actuator and transducer 512 holds a first object on which the test surface resides and anvil 508 supports a second object on which the reference surface resides, such that the test and reference surfaces oppose each other. The necessary force measurements are conducted as described above, and a processor 511 determines the differences between the measured and nominal force values.

Referring now to FIG. 6-2, an apparatus to measure the regularity of a substantially spherical test surface in accordance with an embodiment of the present invention is shown. The same reference numerals are used in FIG. 6-2 (measurement apparatus 650) to represent the same or similar elements of FIG. 5. As can be seen in FIG. 6-2, integrated actuator and transducer 512 holds an object 602 on which a substantially spherical test surface 604 resides and anvil 508 supports a plate 606 on which reference surface 608 resides. The test surface is held at the first separation distance from the reference surface. The force between test surface 604 and reference surface 608 is measured to obtain an exerted force value. The variation in shape of test surface 604 from a nominal spherical surface is indicated by the difference between the exerted force value and a nominal force value that would be expected to be exerted between test surface 604 and reference surface 608 as a result of the Casimir force if the shape of test surface 604 were equivalent to a nominal spherical surface. The Casimir force is exerted between a substantially spherical surface and a substantially flat plate in close proximity in a vacuum according to the following relation:

$$F = \frac{\pi^3 R \hbar c}{360 d^3} \qquad \text{Equation (3)}$$

where R is the radius of the spherical object and d is the separation distance between the spherical object and the plate.

Figure 7:
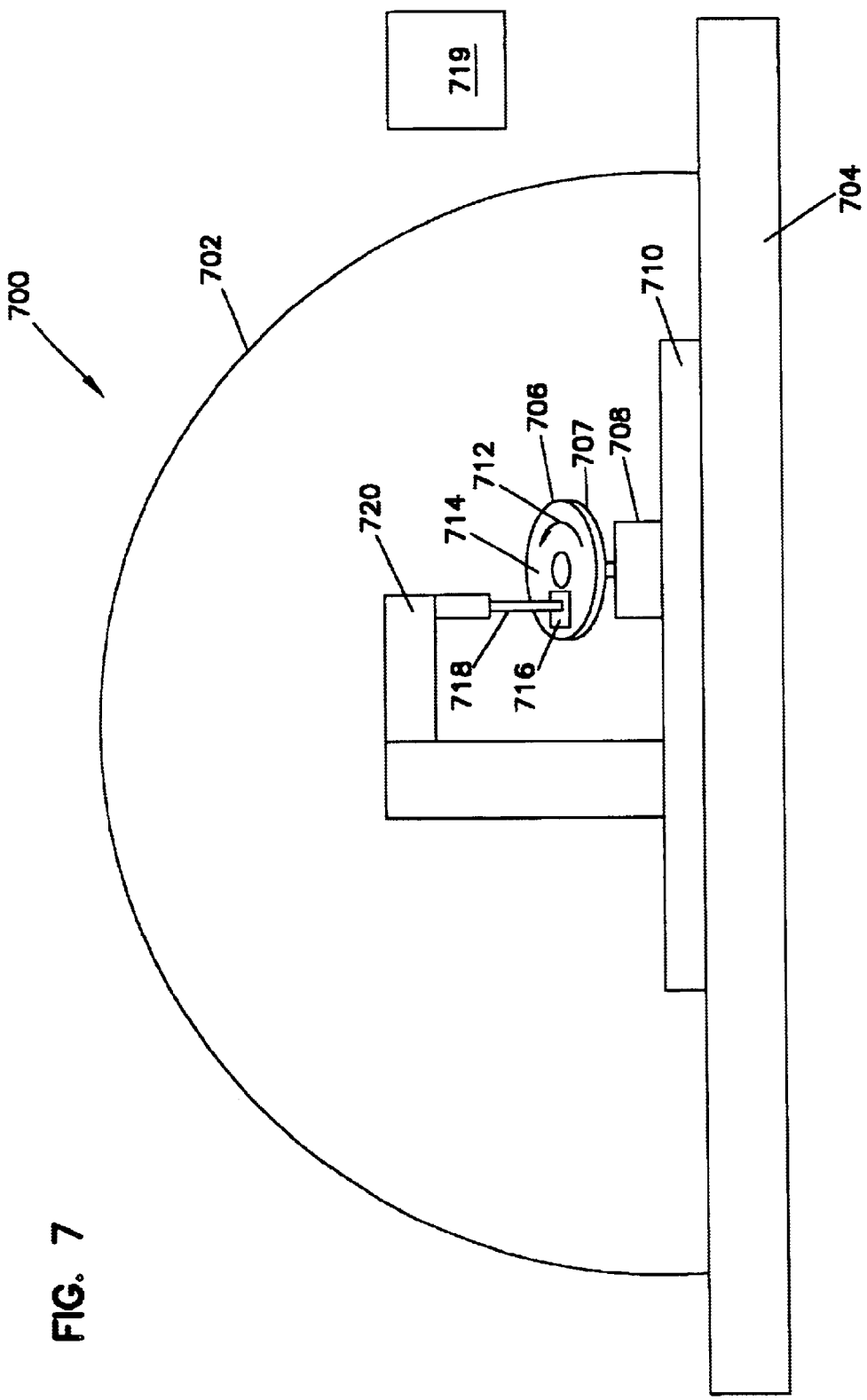
FIG. 7 is an apparatus to determine the flatness of surfaces of discs employed in disc drives in accordance with an embodiment of the present invention.

Referring now to FIG. 7, an apparatus to determine the flatness of surfaces of discs employed in disc drives in accordance with an embodiment of the present invention is shown. Disc testing apparatus 700 includes a vacuum bell jar 702 with a base 704, which holds the test surfaces at a near vacuum. Test disc 706 is mounted on a spindle motor 708 that is supported on a platform 710. Test disc 706 is spun or rotated as shown by arrow 712. Test disc 706 may be supported at its lower surface (opposite test surface 714) by a plate (such as 707) to provide stability during rotation. Reference plate 716 having a flat disc opposing surface is held proximate disc surface 714 by an integrated actuator and force transducer 718, supported by fixture 720. The separation distance between the disc opposing surface of the reference plate and the disc surface is adjusted by the integrated actuator and force transducer 718. A controller 719 is coupled to force transducer 718 and spindle motor 708. The speed of rotation of test disc 706 and the frequency at which force measurements are made between the disc surface 714 and the disc opposing surface of reference plate 716 is adjusted by the controller 719. The controller 719 stores different measured force values between disc surface 714 and the disc opposing surface of reference plate 716 while disc 706 is rotating. Substantial variations amongst the measured force values indicate that test disc 706 is defective. Test disc 706 may be classified as "passed" or "failed" based on a predetermined threshold for variations in measured force values.

Figure 8:
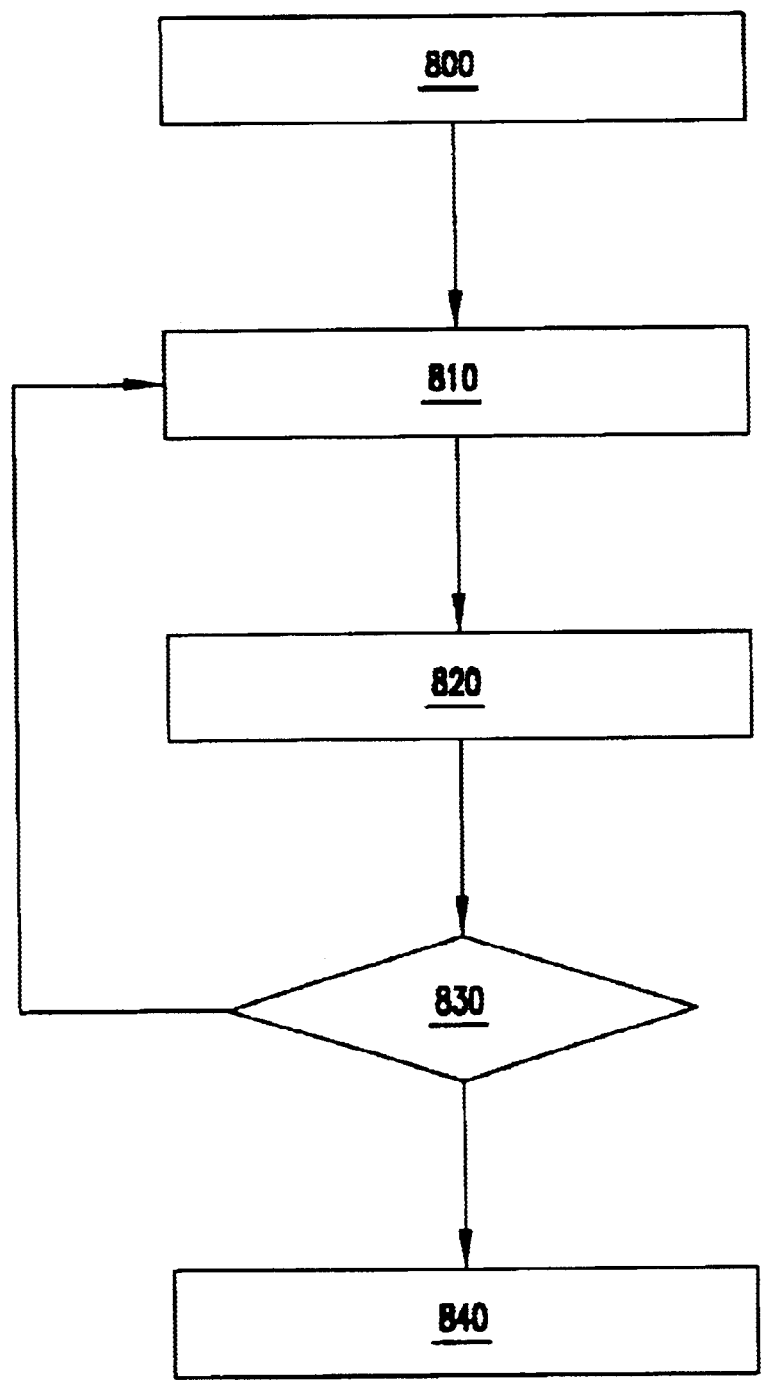
FIG. 8 is a flow chart representing a method of determining the degree to which the shape of an electrically conductive surface varies from the nominal shape according to an embodiment of the present invention.

Referring now to FIG. 8, a flow chart, representing a method of determining the degree to which the shape of an electrically conductive surface varies from the nominal shape, is shown. At step 800, a first surface is held at a known separation distance from a second surface having a known shape. At step 810, the force exerted between the surfaces is measured. At step 820, the surfaces are moved closer to each other. At step 830, a determination is made if the surfaces are touching each other. If the surfaces are touching, the method proceeds to step 840 where a comparison is made between the last-measured force to a nominal force that would be expected to be exerted as a result of the Casimir force if the shape of the first surface were equivalent to the nominal shape.

In the embodiments of the present invention described above, steps are taken to reduce or counteract contact forces between surfaces, since they can be large in comparison with the Casimir force. For example, dissimilar metals may be employed for the conductive surfaces. Contact between surfaces may be detected using electrical or optical means. Measured force values obtained after contact between surfaces occurs are always discarded. Upon contact, the surfaces are separated and may be repaired as necessary.

In summary, a method of measuring the distance between first and second proximately disposed electrically conductive surfaces includes a step, such as 300, for measuring the force exerted between the first and second surfaces to obtain an exerted force value. A separation distance between the first and second surfaces is determined at a step, such as 310, as a function of the exerted force value.

Another method includes determining the degree to which the shape of a first electrically conductive surface varies from a nominal shape includes a step, such as 600, for holding the first surface a known separation distance from a second electrically conductive surface having a known shape. The force exerted between the first and second surfaces is measured to obtain an exerted force value at a step such as 610. The measured exerted force value is compared to a nominal force value that would be expected to be exerted between the first and second surfaces as a result of the Casimir force if the shape of the first surface were equivalent to the nominal shape at a step such as 620. A difference between the measured exerted force value and the nominal force value is obtained at a step such as 620.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the fall extent indicated by the broad general meaning of the terms in which the appended claims are expressed. For example, the particular elements may vary depending on the particular application for the measurement system while maintaining substantially the same functionality without departing from the scope and spirit of the present invention.

What is claimed is:

1. A method of determining the degree to which the shape of a first electrically conductive surface varies from a nominal shape, the method comprising steps of:
   (a) holding the first surface a known separation distance from a second electrically conductive surface having a known shape;
   (b) measuring the force exerted between the first and second surfaces to obtain a measured exerted force value; and
   (c) comparing the measured exerted force value to a nominal force value that would be expected to be exerted between the first and second surfaces as a result of the Casimir force if the shape of the first surface were equivalent to the nominal shape, to obtain a difference between the measured exerted force value and the nominal force value.

2. The method of claim 1 wherein the first surface is a surface of a disc employed in a disc drive.

3. The method of claim 1 wherein the first and second surfaces are substantially flat surfaces that are disposed substantially parallel to each other, wherein the nominal shape is a flat surface, wherein measuring step (b) comprises measuring the attractive force between the first and second surfaces to obtain an attractive force value and wherein the nominal force value is a value of an attractive force that would be expected to be exerted between the first and second surfaces as a result of the Casimir force if the first surface was the nominal flat surface.

4. The method of claim 3 wherein the nominal force value is calculated using the relation:

$$F = \frac{A\pi^2 \hbar c}{240 d^4}$$

where F is the nominal force value, A is the area of the smaller of the first and second surfaces, $\hbar$ is Planck's constant, c is the speed of light, and d is the separation distance.

5. The method of claim 1 wherein the first surface is a substantially spherical surface and the second surface is a substantially flat surface.

6. The method of claim 1 further comprising steps of:
   (d) if the difference between the measured exerted force value and the nominal force value is greater than a predetermined threshold amount, classifying the first surface as a failing surface; and
   (e) if the difference between the measured exerted force value and the nominal force value is less than or equal to the predetermined threshold amount, classifying the first surface as a passing surface.

7. The method of claim 1 further including steps (d) and (e), performed prior to step (c), of:
(d) if the first and second surfaces are not in contact with each other, moving the first surface closer to the second surface, to a new known separation distance; and
(e) repeating measuring step (b) and moving step (d) until the first and second surfaces are in contact with each other;
wherein comparing step (c) comprises comparing the last exerted force value measured prior to the first and second surfaces contacting each other to a nominal force value that would be expected to be exerted between the first and second surfaces as a result of the Casimir force if the shape of the first surface were equivalent to the nominal shape.

8. The method of claim 1 wherein the first surface resides on a first side of a first object and the second surface resides on a first side of a second object and wherein measuring step (b) comprises measuring the force with a piezoelectric transducer affixed to one of a second side of the first object and a second side of the second object.

9. The method of claim 1 wherein the first surface is a test surface of a rotating disc, and wherein a plurality of force measurements are performed between the test surface and the second surface to obtain a plurality of measured exerted force values instead of step (b), and wherein defects in the test surface are determined by comparing each one of the plurality of the measured exerted force values with a different one of the plurality of measured exerted force values instead of step (c).

10. An apparatus for determining the degree to which the shape of a first electrically conductive surface varies from a nominal shape, the apparatus comprising:
an electrically conductive test surface having a known shape;
a grasping member that holds the first surface a known distance from the test surface;
a force gauge that measures the force exerted between the first surface and the test surface to obtain a measured exerted force value; and
a processor adapted to compare the measured exerted force value to a nominal force that would be expected to be exerted between the first surface and the test surfaces as a result of the Casimir force if the shape of the first surface were equivalent to the nominal shape.

11. The apparatus of claim 10 wherein the first surface resides on a first side of a first object and the test surface resides on a first side of a test object and wherein the force gauge comprises a piezoelectric transducer affixed to one of a second side of the first object and a second side of the test object and adapted to produce an electrical signal based on an amount of stress undergone by the transducer.

12. The apparatus of claim 10 wherein the first surface is a surface of a disc employed in a disc drive.

13. The apparatus of claim 10 wherein the first and second surfaces are substantially flat surfaces that are disposed substantially parallel to each other, wherein the nominal shape is a flat surface, wherein the force gauge measures the attractive force between the first and second surfaces to obtain an attractive force value, and wherein the nominal force value is a value of an attractive force that would be expected to be exerted between the first and second surfaces as a result of the Casimir force if the first surface was the nominal flat surface.

14. The apparatus of claim 13 wherein the nominal force value is calculated using the relation:

$$F = \frac{A\pi^2 \bar{h} c}{240 d^4}$$

where F is the nominal force value, A is the area of the smaller of the first and second surfaces, $\bar{h}$ is Planck's constant, c is the speed of light, and d is the separation distance.

15. The apparatus of claim 10 wherein the first surface is a substantially spherical surface and the second surface is a substantially flat surface.

16. The apparatus of claim 10 wherein the processor is further adapted to classify the first surface as a failing surface if the difference between the measured exerted force value and the nominal force value is greater than a predetermined threshold amount, and to classify the first surface as a passing surface if the difference between the measured exerted force value and the nominal force value is less than or equal to the predetermined threshold amount.

17. The apparatus of claim 10 wherein:
the force gauge is adapted to move the first surface closer to the second surface, and to measure a last exerted force value prior to the first and second surfaces contacting each other; and
the processor further adapted to compare the last exerted force value measured prior to the first and second surfaces contacting each other to a nominal force value that would be expected to be exerted between the first and second surfaces as a result of the Casimir force if the shape of the first surface were equivalent to the nominal shape.

18. The apparatus of claim 10 wherein the first surface resides on a first side of a first object and the second surface resides on a first side of a second object, and wherein the force gauge comprises a piezoelectric transducer affixed to one of a second side of the first object and a second side of the second object.

19. The apparatus of claim 10 wherein the first surface is a test surface of a rotating disc, and wherein the force gauge is adapted to perform a plurality of force measurements between the test surface and the second surface to obtain a plurality of measured exerted force values, and wherein the processor is adapted to determine defects in the test surface by comparing each one of the plurality of the measured exerted force values with a different one of the plurality of measured exerted force values.

* * * * *